Aug. 27, 1963 R. O. PETERSON 3,102,056
SURFACE FINISHING AND CLEANING APPARATUS AND METHOD
Filed Oct. 6, 1958 4 Sheets-Sheet 1
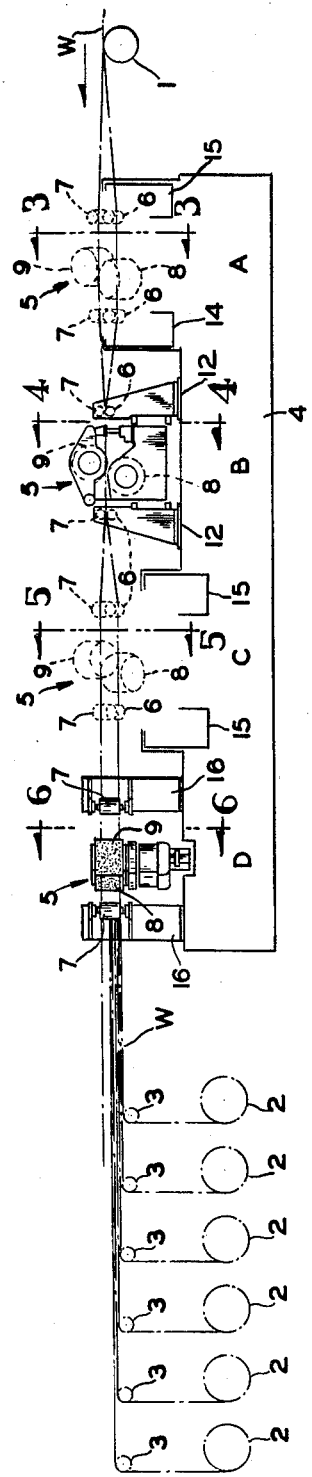
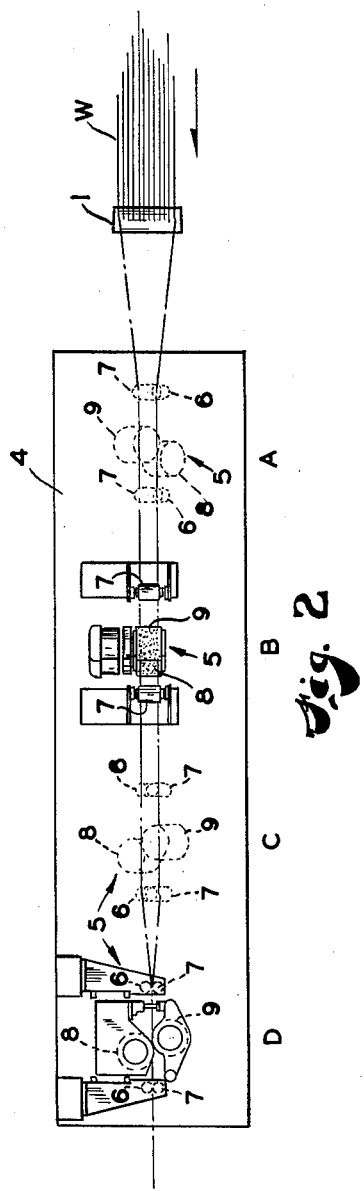
INVENTOR.
RUBEN O. PETERSON
BY
Oberlin, Maky, & Donnelly
ATTORNEYS Aug. 27, 1963     R. O. PETERSON     3,102,056
SURFACE FINISHING AND CLEANING APPARATUS AND METHOD
Filed Oct. 6, 1958     4 Sheets-Sheet 2
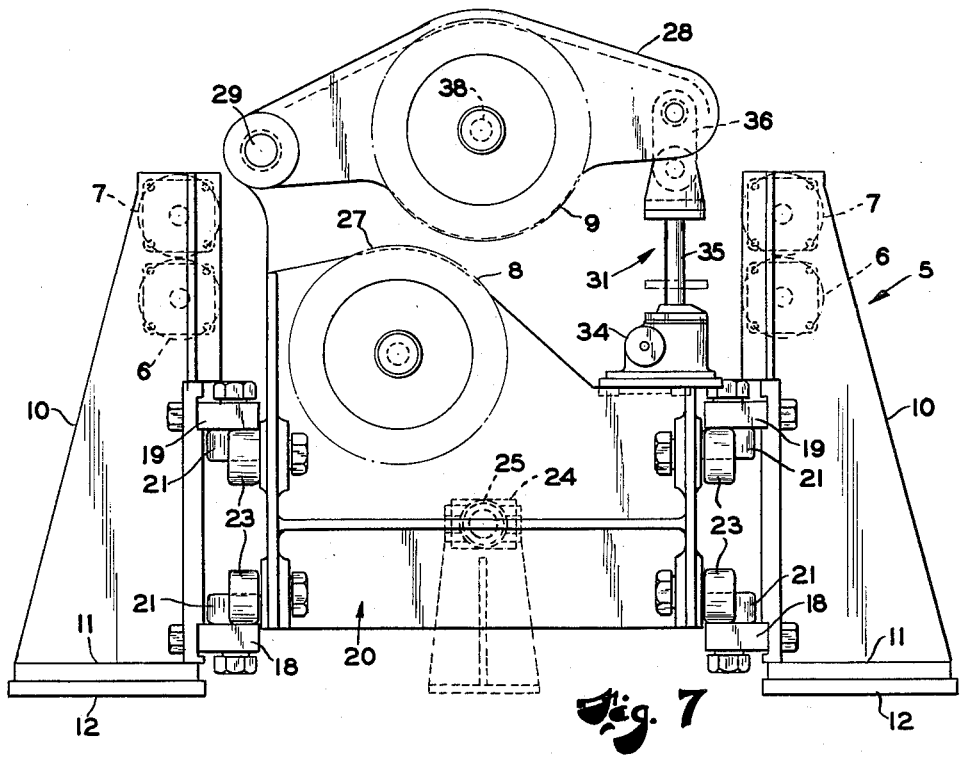
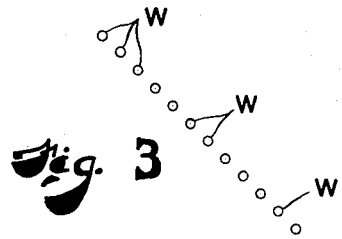
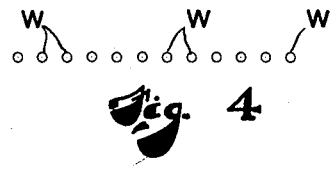
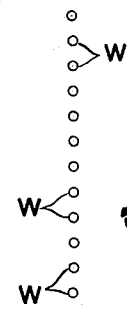
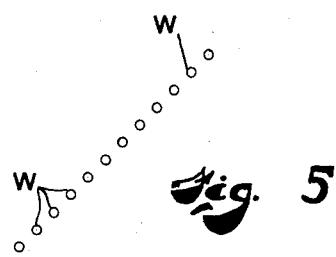
INVENTOR.
RUBEN O. PETERSON
BY
Oberlin, Maky, & Donnelly
ATTORNEYS

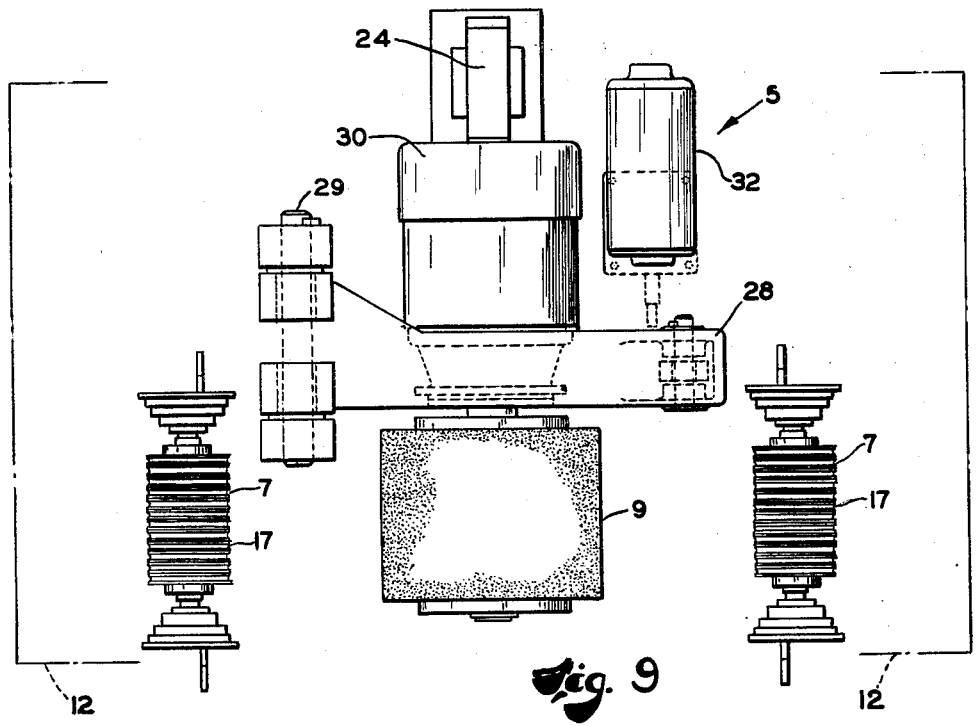
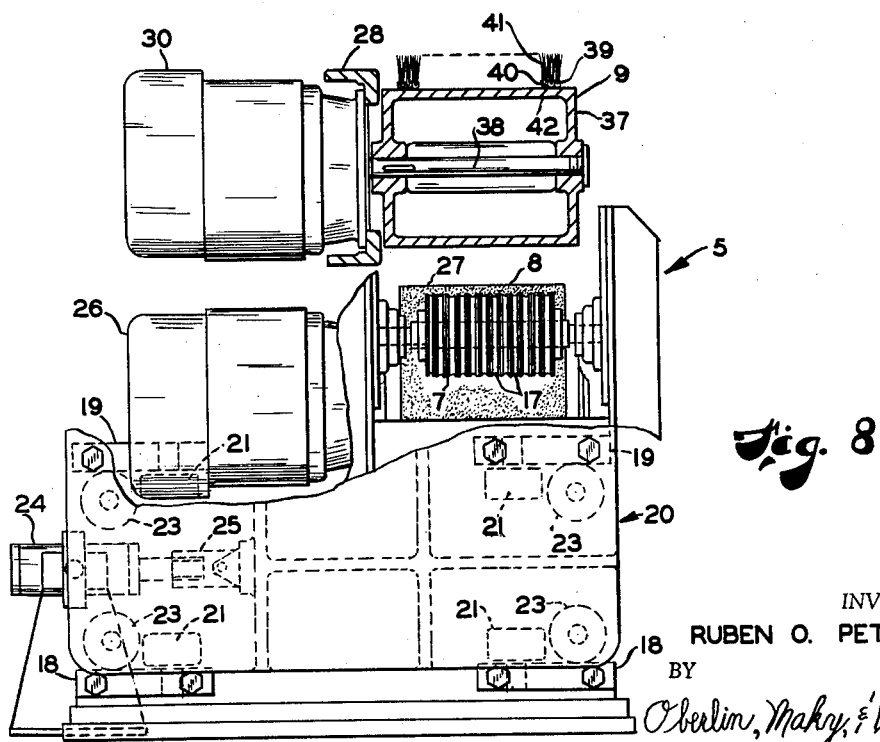

INVENTOR.
RUBEN O. PETERSON

United States Patent Office 3,102,056
Patented Aug. 27, 1963

3,102,056
SURFACE FINISHING AND CLEANING
APPARATUS AND METHOD
Ruben O. Peterson, University Heights, Ohio, assignor to
The Osborn Manufacturing Company, Cleveland,
Ohio, a corporation of Ohio
Filed Oct. 6, 1958, Ser. No. 765,454
30 Claims. (Cl. 134—9)

The present invention relates generally as indicated to a surface finishing and cleaning apparatus and method, and more particularly to a method of and apparatus for continuously surface-conditioning a lineally traveling band of elongated articles such as a plurality of wires and the like.

It is of course recognized in the art of cleaning or surface-conditioning of wires, rods and the like that brushing of the surfaces of such articles produces certain beneficial results that are not obtainable with chemical treatments. A discussion of some of these beneficial effects of the brushing of wires and the like for subsequent drawing operations rather than pickling or like operations, will be found in my co-pending application Serial No. 437,215, now Patent No. 2,876,146, filed June 16, 1954. In said co-pending application there is disclosed a method and apparatus wherein a lineally traveling wire or like elongated article is caused to follow a devious course and, in so doing, to pass successive work stations at which brushes or like surface treating implements are brought into engagement with different peripheral portions of the article as it travels lengthwise.

In the brushing, for example, of a single lineally traveling wire it would be more or less obvious either to position a series of rotary brushes at different angles to contact different peripheral portions of the wire as it travels lengthwise in engagement with the brushes, or alternatively suitably to twist the wire about its longitudinal axis as it travels past a series of aligned brushes arranged to contact the wire. Another alternative involving complicated moving parts would be to turn the revolving brushes about the axis of the wire and in this way the entire periphery of the wire would be brushed during the course of lineal travel of the wire if it moved slowly enough or if enough synchronized turning heads were provided.

However, in the interests of simple control, increased productivity, and reduced unit cost, it is evident that there is a need for an apparatus and method by which a plurality of such wires or other elongated articles may be surface-conditioned simultaneously. The above-mentioned known expedients for the surface-conditioning of single elongated articles are not feasible for use in surface-conditioning of a plurality of such articles owing to the necessity either of employing a corresponding number of apparatuses or of providing expensive and complex mechanisms for twisting the articles about their longitudinal axes or for turning the brushes about the longitudinal axes of the articles.

Accordingly, it is a principal object of this invention to provide a novel method and apparatus for simultaneously and continuously brushing, or otherwise surface-conditioning, a plurality of elongated articles such as wires and the like.

It is another object of this invention to provide a novel method of and apparatus for surface-conditioning a plurality of wires and the like simultaneously while the wires travel lineally in the form of a band.

It is another object of this invention to provide a method of and apparatus for surface-conditioning a plurality of wires and the like simultaneously while the wires travel in the form of a band which may appear to be twisted or oriented about an axis extending lengthwise thereof, such apparent twisting of the band of wires being accomplished by lowering or raising individual wires of the band without necessarily introducing any twisting in the component wires but effective to expose different peripheral portions of each wire to successive similarly oriented brushes or the like.

It is another object of this invention to provide a method of and apparatus for surface-conditioning a plurality of wires and the like uniformly about the peripheries thereof while the wires are traveling lineally in band form and while the band of wires is oriented to different angular positions about an axis extending lengthwise thereof.

It is another object of this invention to provide a method of and apparatus for surface-conditioning a plurality of longitudinally traveling wires while traveling as a band in which the band of wires is oriented, at the conclusion of the surface-conditioning operation thereon, to facilitate take-up by reels or the like, arranged successively in a line.

It is another object of this invention to provide a cleaning, finishing, or brushing apparatus which is arranged to clean, finish or brush a plurality of wires and the like, simultaneously and continuously between pairs of cylindrical tools such as brushes and thereby to clean, finish or brush the complete circumference of each wire.

It is another object of this invention to provide a brushing apparatus of the character indicated which employs power tools, such as cylindrical rotary brushes, arranged generally transversely of a band of longitudinally traveling wires to operate simultaneously upon all of the wires of such band and in which a series of such power tools are arranged to surface-condition the wires uniformly about their entire peripheries.

It is another object of this invention to provide a brushing apparatus of the character indicated in which rotary cylindrical power brushes disposed generally transversely of a band of longitudinally traveling wires are mounted for axial reciprocation while engaged with the wires so as to uniformly distribute the wear of the brushes and thereby prevent grooving thereof as might occur if the wires were continuously engaged with the same axial portions of the brushes. In that connection, it is contemplated to axially reciprocate the wire guides with respect to the brushes.

It is another object of this invention to provide a brushing apparatus of the character indicated which is operative to continuously brush a longitudinally moving band of wires and the like while the band is angularly oriented to different positions about an axis extending lengthwise of the band.

It is another object of this invention to provide a brushing apparatus of the character indicated which includes a series of work stations which are angularly related with respect to one another to operate upon a lineally traveling band comprising a plurality of wires and the like, and which is effective angularly to orient the band at the successive work stations to present different peripheral portions of the wires to the correspondingly angularly related brushes or like surface conditioning elements.

It is another object of this invention to provide a brushing apparatus of the character indicated for simultaneously brushing a plurality of longitudinally traveling wires which travel in band form, such apparatus being characterized in that the brushes thereof are relatively adjustable to vary cleaning or surface-conditioning pressure against the wires as dictated by the final desired results and/or by the size and strength of the wires.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a front elevation view, somewhat diagrammatic in character, showing an apparatus for simultaneously and uniformly brushing a plurality of longitudinally traveling wires which enter and leave the apparatus in the form of a band or web;

FIG. 2 is a plan view of the apparatus as viewed from the top of FIG. 1;

Figure 10:
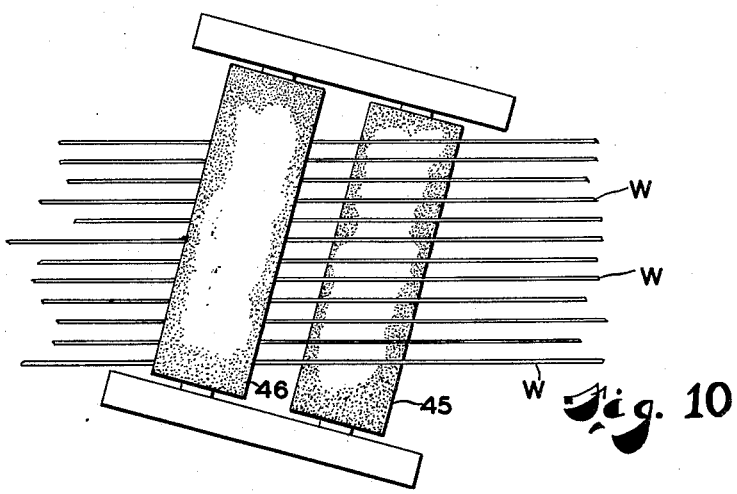

FIGS. 3, 4, 5 and 6 are cross-section views showing the oriented position of the band of wires at the successive work stations A, B, C, and D, such sections having been taken substantially along the respective lines 3—3, 4—4, 5—5, and 6—6, FIG. 1;

FIG. 7 is a front elevation view of a suitable tool operating stand which is one of the brushing stands, several of which are employed herein as shown in FIGS. 1 and 2, such stands preferably being of identical construction except oriented to different angular positions about an axis disposed lengthwise of the traveling band of wires;

FIG. 8 is an end elevation view, partly in cross-section, as viewed from the left-hand side of FIG. 7;

FIG. 9 is a plan view of the brushing stand of FIG. 7 as viewed from the top of the latter;

FIG. 10 is a top plan view showing diagrammatically an optional arrangement in which the brushes of the respective stands are skewed with respect to the direction of longitudinal travel of the band of wires which are being continuously and uniformly brushed; and FIGS. 11 to 14 are much enlarged cross-sections showing the relative positions of two adjacent wires at the stations A to D, respectively.

*The Surface-Conditioning Apparatus as a Whole*

As best shown in FIGS. 1 and 2, there is provided at the right-hand end of the apparatus a suitable guide roll 1 which may be formed with peripheral grooves to guide a plurality of wires W which are to be surface-conditioned. By way of example only, there is shown herein a band of twelve disconnected generally parallel wires W which are traveling in the direction of the arrow, that is, from right to left. Preferably the guide roll 1 is mounted for rotation about a horizontal axis.

At the left of FIGS. 1 and 2, there are provided a series of power-driven takeup reels 2 (only six having been shown herein) which pull the respective wires W lineally through the apparatus and, preferably, there is associated with each reel 2, a guide roll 3 over which the respective wires W pass. The band of lineally traveling wires W as it leaves the brushing apparatus is in a vertical plane and each guide roll 3 is at a progressively higher level from right to left to keep the wires W in generally straight and parallel relationship to one another for straight pulling through the apparatus and to prevent the wires W from contacting one another.

It is to be understood that, if desired, the brushed wires W may be coated, plated, drawn or otherwise operated upon, between the brushing apparatus and the aforesaid takeup apparatus.

The brushing apparatus is interposed between the guide roll 1 and the above-described reeling mechanism and comprises a longitudinally extending base 4 on which a series of brush stands 5 are mounted to provide a series of work stations A, B, C, and D at each of which different peripheral portions of the several wires W are simultaneously brushed, the entire peripheries of the wires W having thus been brushed by the time that the band of wires W has moved through the last work station D. As will be seen later, a fewer number or greater number of brush stands 5 may be employed.

Figure 11:
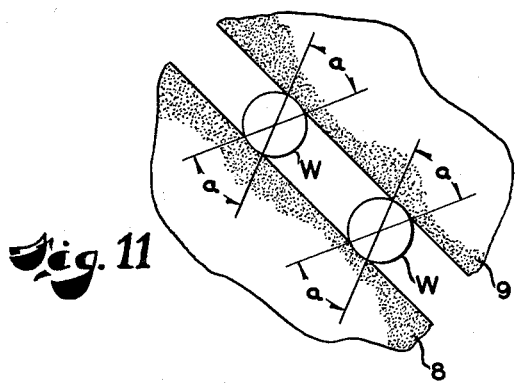

In the present case, the band of wires W which lies in a horizontal plane at the guide roll 1 is oriented about an axis extending lengthwise of the band at the work station A, this being most clearly shown in FIGS. 3 and 11. Such orienting of the portion of the band of wires at station A is accomplished by mounting the brush stand 5 at an angle such that the axes of the brush stand guide rolls 6 and 7 and of the power tools such as brushes 8 and 9 are at that angle as shown in FIG. 3. Accordingly, by so orienting the band of wires W at work station A with respect to the horizontal disposition of the band at the guide roll 1, the opposite faces $a$ (FIG. 11) of the band as constituted by the wires W are brushed at station A.

Figure 12:
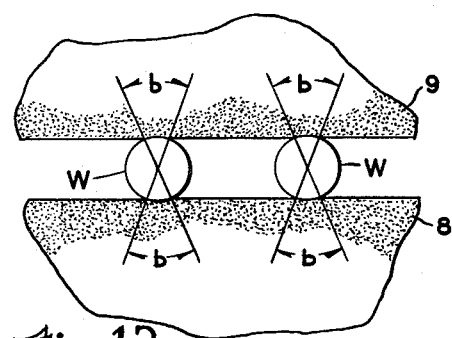

At station B, the brush stand guide rolls 6 and 7 and the power brushes 8 and 9 are disposed for rotation about horizontal axes, this being clearly shown in FIGS. 4 and 12, whereby the band of wires W is now oriented with respect to the band of wires W at the station A, whereby other peripheral portions $b$ (FIG. 12) of the wire W constitute the opposite faces of the band and these then are brushed at station B.

Figure 13:
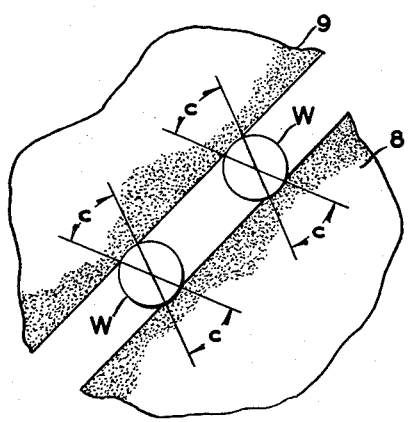

At station C the brush stand 5 is mounted in an inclined position to orient the band of wires W as best shown in FIGS. 5 and 13, whereby the peripheral portions $c$ (FIG. 13) of the wires W are exposed for operation upon by the brushes 8 and 9 of the stand 5.

Figure 14:
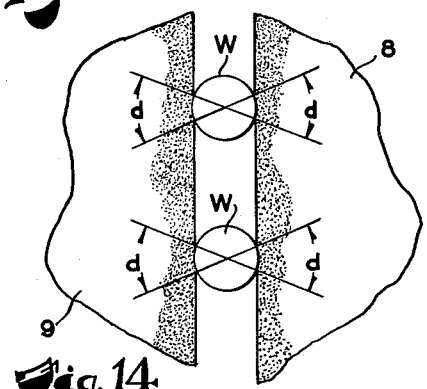

Finally, at work station D, the brush stand 5 is mounted so that the guide rolls 6 and 7 and power brushes 8 and 9 are disposed in a vertical position, whereby the band of wires W is reoriented with respect to the position of the band at station C, the vertical disposition of the band of wires W being best shown in FIGS. 6 and 14. At station D the peripheral portions $d$ (FIG. 14) of the wires are brushed by the brushes 8 and 9.

It is to be noted that the orienting of the band of wires W at stations A, B, C, and D does not twist the individual wires but, rather, the band as a whole is successively turned or oriented to expose different peripheral portions of the wires for brushing. In this case, the four orientations at A, B, C, and D of the band of wires W through 45° for each orientation, enables the cylindrical power tools such as brushes 8 and 9 of the four stands 5 to operate upon the entire peripheries of the respective wires as clearly shown in FIGS. 11 to 14.

As before mentioned, the brush stands 5 at the stations A, B, C, and D are preferably of identical structure, differing only in the angular position in which each is mounted at its respective station.

*The Detail Construction of Each Brush Stand*

Referring now to FIGS. 7, 8 and 9, there is shown therein in detail a preferred form of brush stand 5, four of which are employed in the complete apparatus as shown in FIGS. 1 and 2.

Herein, each brush stand 5 comprises end brackets 10 which at their feet 11 are adapted to be mounted on horizontal supports 12 on the base at station B, on inclined supports 14 and 15 at stations A and C, and on vertical supports 16 at station D. These brackets 10, each mount a pair of idler guide rolls 6 and 7, one or both of each pair being formed with a series of peripheral grooves 17 to accommodate the wires W constituting the band of wires which is to be surface-conditioned.

The end brackets 10 are provided with guide plates or tracks 18 and 19, along which the brush carrier 20 is mounted for reciprocation transversely of the band of wires W, the carrier 20 being so mounted as by means of perpendicularly related antifriction rollers 21 and 23 which are respectively journalled on tracks 18—19 to engage the ends of carrier 20 and on the ends of carrier 20 to engage the inner parallel faces of the tracks 18 and 19. Suitable means (not shown herein) such as an electric or fluid motor, is connected to the actuator 24 which is coupled at 25 to the carrier 20.

Rotatable with respect to the carrier 20 is a rotary cylindrical brush 8 carried by and driven by an electric motor 26 which, preferably, is fixedly mounted on the carrier 20. As shown in FIG. 8, the axial length of the peripheral working face 27 of said brush 8 is greater than the width of the band of wires W so that the brush 8 may be slowly reciprocated to uniformly distribute the brush wear and to prevent the formation of grooves in the periphery of the brush as might otherwise occur if the wires were constantly engaged with the same axial portions of the brush 8.

With reference to the pairs of guide rolls 6 and 7, the periphery 27 of the brush 8 is somewhat above a straight line extending from the point of tangency of one pair of rolls 6 and 7 to the point of tangency of the other pair of rolls 6 and 7.

Also mounted on the carrier 20 is another brush 9, this one being mounted on an arm 28 which is pivotally connected at one end at the pin 29 to the carrier housing 20 and, in this case, the drive motor 30 for driving the brush 9 is preferably fixedly mounted on the arm 28. The free end of the arm 28 is connected to an electric motor operated adjusting mechanism 31 which either raises or lowers the brush 9 with respect to the other brush 8 so as to apply desired pressure against the band of wires W. The degree of brushing pressure would, of course, be quite light in the case of small diameter wires W of weak metal and may be considerably greater in the case of larger diameter wires, or wires of high tensile strength.

This adjusting mechanism 31 may comprise, for example, the electric motor 32 which is mounted on the carrier 20 and which, through suitable gearing 34 such as a worm gear and worm wheel (not shown), is effective to raise and lower the vertical rod 35 which is connected by link 36 to the free end of the arm 28. In such gearing, the worm wheel may have threaded engagement with the lower end of rod 35. If desired, the motor 32 may be automatically controlled to raise and lower the top brush 9 in accordance with the pressure between the brushes 8 and 9 and the band of wires W. One known manner of accomplishing that is to provide an ammeter in the powerline for the brush drive motors 26 and 30 and when the current draw exceeds a predetermined value the motor 32 will be energized to raise the top brush 9 and, conversely, when the ampere draw drops down below a prescribed value, the motor 32 will be energized to move the top brush 9 downwardly to apply greater pressure on the wires W.

While the brush 9, and also brush 8, may be of various forms, I have chosen to show for purposes of illustration only, a typical construction of rotary power brush which includes a brush arbor 37 keyed on the drive shaft 38 of the brush drive motor 30 and having helically wound therearound a brush strip 39 including the channel-back 40 and doubled-up tufts 41 of bristle material retained in the channel-back 40 as by means of a retaining wire 42.

The bristles 41, of course, will ordinarily be made of alloy steel when brushing metallic wires for subsequent drawing operations or for cleaning such wires for subsequent pickling operations. It is to be understood that other known bristle materials may be employed, depending upon the type of surface-conditioning which is to be done.

The brushes 8 and 9 of each brush stand 5 are longitudinally offset to flex the wires W (see FIG. 8) during their course of travel through the work stations A, B, C, and D and to enable varied pressure contact without the brushes 8 and 9 contacting each other.

The foregoing description in conjunction with FIGS. 11 to 14 is based on the assumption that each brush 8 and 9 will effectively brush one-eighth of the peripheral surface of each wire W at each station A, B, C, and D and, of course, the portions a, b, c, and d of the peripheral surface of each wire W which is thus brushed may be extended by applying greater pressure between the brushes 8 and 9 and the wires W, but even in that case the entire peripheral portion of each wire will be intensely brushed throughout its circumference or periphery due to overlap.

As originally mentioned, the number of brush stands 5 required may be greater than or less than the four herein shown. For instance, if the degree of brushing is considered to extend over an angle of 60° on each opposite face of the band of wires at each work station, then the stands 5 may be arranged to twist or orient the band of wires a total of three times through 60° angles, instead of four times as herein.

By the same token the degree of twisting or orientation of the band, may be through smaller angles than 45° as herein shown but that will require a correspondingly greater number of brush stands 5.

In the present case (see FIGS. 3 to 6) the band of wires W preferably is twisted or oriented about the longitudinal centerline of the band but obviously the twisting may be about some other axis that extends lengthwise of the band.

In the brush stand 5 shown in FIGS. 7, 8 and 9, and also those shown in FIGS. 1 and 2, the axes of the brushes 8 and 9 are shown as being at right angles to the direction of travel of the band of wires W and parallel to the opposite faces of the band of wires W. In some cases it may be preferred to have the axes of the brushes 45 and 46 skewed as shown, for example, in FIG. 10.

Operation

In the particular embodiment of the invention herein disclosed excellent results have been obtained on the surface-conditioning for drawing of a band of twelve wires W of say, .060 to .187″ diameter spaced apart ¾″ center to center distance while the lineal speed of the wire is from about 10 feet per minute to about 90 feet per minute. The peripheral speed of the brushes 8 and 9 of 16″ diameter is quite high, for example, 7,200 feet per minute and, of course, with such relation of relative lineal or peripheral speeds of the wires W and brushes 8 and 9, it is a matter of indifference in which the direction the brushes 8 and 9 are rotated, and of course, the lineal speed of the wires W may be much greater than 90 feet per minute, if desired. In the use of this equipment it has been found that periodic reversal of the brush drive motors 26 and 30 is desired so as to provide sharp edges on the brush bristles 42. Of course, when the brushes 8 and 9 are rotated in a direction opposite to the direction of travel of the band of wires W, wire tensioning means are not required at the inlet end since, in that case, the brushes 8 and 9 tend to impede the longitudinal travel of the band whereby it must be pulled through as by the power driven reels 2. When the brushes 8 and 9 are rotated in the same direction as the wire travel, suitable wire tensioning means should be provided at or adjacent the guide roll 1 or on the pay-out blocks (not shown) from which the wires W are supplied since, in that case, the brushes 8 and 9 tend to feed the band of wires W in the direction of travel.

It can be seen that with the present apparatus and method any number of wires W traveling as a band of disconnected wires may be simultaneously and uniformly surface-conditioned with a simplified form of apparatus which includes basically, a series of brush stands 5 which are mounted in different angular positions to effect twisting or orienting of the band of wires W to different angular positions to thereby expose different peripheral portions of the wires W to brushing action at the respective work stations. It is to be noted that there are not involved any complicated mechanisms for moving brushes about individual wires or for twisting the individual wires about their longitudinal axes. The band of wires W may comprise as many wires as desired and they may be disposed in close side-by-side relation if desired, so as to travel together as a relatively narrow band.

Although the surface treating herein is a brushing operation it is to be understood that other operations such as buffing, polishing, cleaning, etc. may be performed on the plurality of adjacent parallel longitudinally traveling elongated articles. In essence, such array of elongated articles are rearranged relative to each other at longitudinally spaced regions so as to expose different portions of the article peripheries, unobstructed by the other articles, while maintaining the articles substantially untwisted about their respective longitudinal axes and then subjecting the different exposed portions of the articles to the surface conditioning means in each such region. In the case of surface treating of elongated articles, such as wires, it is preferred to accomplish the same by relatively moving the surface treating implements lengthwise of the articles, this being effective to greatly enhance the physical properties of the articles. In particular, the brushing of wires lengthwise thereof effectively removes slivers or "needles," removes foreign matter from the surfaces of the wires and removes pits and other irregularities from the surfaces of the wires. By using the present apparatus and method the entire peripheries of the array of elongated articles may be uniformly and efficiently surface treated.

Other modes of applying the principle of the invention may be employed, change being made as regards the details described, provided the features stated in any of the following claims or the equivalent of such be employed.

I therefore particularly point out and distinctly claim as my invention:

1. Surface treating a plurality of adjacent substantially parallel elongated articles while traveling longitudinally in a generally straight horizontal path by vertically displacing such articles relative to each other at longitudinally spaced regions while traveling in such generally straight path as aforesaid to expose different portions of article peripheries unobstructed by other of the articles, and simultaneously subjecting such exposed portions to surface conditioning means in each such region.

2. The method of claim 1 wherein such array of articles is engaged at each such region by a power-driven cylindrical rotary brush.

3. The method of surface treating elongated articles such as wires which comprises arranging a plurality of them in an array adjacent and generally parallel to one another in a first reference plane, continuously longitudinally advancing such articles in a generally straight path, simultaneously engaging exposed peripheral surface portions of such articles unobstructed by adjacent articles at a work station while such array is disposed in such first reference plane with surface conditioning means, relatively laterally displacing such traveling articles with respect to each other at a further work station into another plane angularly related to such reference plane, while maintaining such articles substantially untwisted about their respective axes thereby exposing different peripheral surface portions unobstructed by adjacent articles, and there simultaneously engaging such newly exposed portions with surface conditioning means while yet the articles are traveling in such generally straight path as aforesaid.

4. The method of claim 3, wherein such array of articles is engaged at each such station by a power driven cylindrical rotary brush.

5. The method of claim 3, wherein such array of articles is thus sequentially turned in at least four successive different angularly related planes at four different work stations, while thus maintained substantially untwisted about their respective axes at each station, effective thereby cumulatively to expose the entire periphery of each such article, and simultaneously power brushing the exposed unobstructed portions of such articles at each such station with power driven cylindrical brushes engaging both sides of such array.

6. The method of surface conditioning a longitudinally traveling band of generally parallel, disconnected elongated articles such as wires and the like which comprises relatively twisting longitudinally spaced regions of such band about lines that extend lengthwise thereof whereby different peripheral portions of such articles, unobstructed by adjacent articles, constitute the opposite faces of such band, and simultaneously engaging at least one face of such band with surface conditioning means at the twisted regions thereof.

7. The method of surface conditioning a plurality of wires and the like while they travel longitudinally in the form of an elongated band in which the wires are disposed in generally parallel, spaced apart relation, which comprises relatively twisting successive longitudinal portions of the band to expose different peripheral portions of the wires as the opposite faces of such band and unobstructed by adjacent wires, and actively brushing the opposite faces of such band as constituted by the different peripheral portions of the wires at such twisted regions of the band.

8. Apparatus for surface treating elongated articles such as wires which comprises guide means adapted to arrange a plurality of such articles in a parallel slightly spaced array lying in a plane at a first work station, power means operative continuously longitudinally to advance such articles, surface conditioning means at said station positioned to engage and act upon exposed peripheral surface portions of such articles unobstructed by adjacent articles, guide means at a later work station disposed to arrange such advancing articles into another plane angularly related to the plane of such articles at said first work station there to expose different peripheral portions of such articles unobstructed by adjacent articles, and surface conditioning means at said later station operative to engage such newly exposed surface portions of such articles.

9. The apparatus of claim 8, wherein said surface conditioning means are power driven cylindrical rotary brushes adapted simultaneously to engage and brush all such articles of such array.

10. The apparatus of claim 8, wherein said surface conditioning means are power driven cylindrical rotary brushes adapted simultaneously to engage and brush all such articles of such array, and said brushes engage both sides of such array at each said station.

11. The apparatus of claim 8, wherein said surface conditioning means are power driven cylindrical rotary brushes adapted simultaneously to engage and brush all such articles of such array and there are at least four said stations including guide means disposed to arrange such array of articles sequentially to four successive different angularly related planes to expose the entire periphery of each such article, and power driven cylindrical rotary brushes at each said station operative to engage and brush each such portion cumulatively to surface condition the entire periphery of each such article.

12. Apparatus for surface conditioning a horizontally longitudinally traveling band of generally parallel, disconnected elongated articles such as wires and the like comprising means operative to conduct such band longitudinally through a work station whereat the component articles of such band are vertically displaced with respect to each other to expose faces of such articles previously obstructed by adjacent articles, and a power operated brushing device at such work station effective simultaneously to brush the newly exposed peripheral portions of such articles that constitute at least one of the opposite faces of the band as thus conducted through said work station.

13. The apparatus of claim 12 wherein said brushing device comprises a rotaary cylindrical brush having a working face in contact with the articles and a brush support that mounts said brush for rotation about an axis such that the articles are brushed lengthwise thereof.

14. The apparatus of claim 13 wherein said device further includes means operative to axially reciprocate said brush to thus distribute wear of the working face of said brush.

15. The apparatus of claim 13 wherein said device further includes backup means by which such band is supported while being brushed.

16. The apparatus of claim 15 wherein said backup means comprises another rotary cylindrical brush that is operative to brush the other one of the opposite faces of the band.

17. Apparatus for finishing and otherwise conditioning the surfaces of the component members of a longitudinally traveling band of elongated articles such as wires and the like comprising means providing a series of work stations whereat different longitudinal portions of such band are relatively oriented to different angular positions about axes extending lengthwise of such band whereby different peripheral portions of the component members of the band at the respective work stations constitute the opposite faces of such band, and a series of power operated brushing devices at the respective work stations operative simultaneously to brush the different peripheral portions of the component members of such band that constitute at least one of the opposite faces of the band at the respective angular positions to which the band is relatively oriented at said work stations.

18. The apparatus of claim 17 wherein each brushing device comprises a rotary cylindrical brush having a working face in contact with the articles and a brush support that mounts said brush for rotation about an axis such that the articles are brushed lengthwise thereof.

19. The apparatus of claim 18 wherein each brushing device further includes means operative to axially reciprocate said brush to thus distribute wear of the working face of said brushes.

20. The apparatus of claim 18 wherein each brushing device further includes backup means by which such band is supported while being brushed.

21. The apparatus of claim 20 wherein each backup means comprises another rotary cylindrical brush that is operative to brush the other one of the opposite faces of the band.

22. Apparatus for simultaneously brushing a plurality of wires and the like comprising an elongated base, a series of brush stands mounted on said base in longitudinally spaced apart relation and each equipped with a pair of parallel rotary cylindrical brushes between which a band of generally parallel, disconnected wires is adapted to pass and to be brushed thereby, successive brush stands being angularly disposed with respect to each other about an axis extending lengthwise of said base whereby such band of wires, during its course of travel through successive brush stands, is relatively twisted to present different peripheral portions for contact with the brushes of successive stands.

23. The apparatus of claim 22 wherein means are provided for mounting the brushes of each pair for relative adjustment toward and away from each other to vary the intensity of the brushing of the wires contacted thereby.

24. The apparatus of claim 22 wherein each brush stand is equipped with guide means to maintain the wires in substantially co-planar and predetermined spaced apart relation as they pass between the brushes thereof.

25. The apparatus of claim 24 wherein each stand is provided with means operative to axially reciprocate the brushes thereof to thereby distribute wear of the working faces thereof.

26. The apparatus of claim 22 wherein a wire guide is mounted adjacent to one end of said base in angularly disposed relation to the first one of said brush stands.

27. The apparatus of claim 22 wherein said stands are arranged to operate upon a generally horizontally travelling band of wires, and to orient the band so to be in a generally vertical plane when it leaves the last stand whereby the wires may be successively wound onto reels commencing with the bottom wire.

28. Apparatus for simultaneously brushing a plurality of wires and the like comprising an elongated base, a series of horizontally spaced apart brush stands mounted on said base and each equipped with a pair of motor-driven parallel rotary cylindrical brushes between the working faces of which a band of generally parallel, disconnected wires is adapted to pass generally horizontally and to be brushed thereby, the brushes of successive stands being angularly displaced with respect to each other about axes extending lengthwise of said base whereby such band of wires is successively twisted as it travels horizontally through the successive stands, wire guides at the opposite ends of said stands effective to guide the wires as a flat band between the brushes of the respective stands which is of width less than the axial length of said brushes whereby opposite faces of all of the wires constituting such band are brushed simultaneously.

29. The apparatus of claim 28 wherein said brushes are axially reciprocably mounted on said stands, and wherein means are provided to axially reciprocate said brushes while in contact with the horizontally travelling band of wires.

30. The apparatus of claim 28 wherein one of each pair of brushes is longitudinally offset with respect to the other so as to flex the band of wires passing therebetween.

References Cited in the file of this patent

UNITED STATES PATENTS

| | | |
|---|---|---|
| 301,184 | Tucker | July 1, 1884 |
| 1,436,464 | Sundh | Nov. 21, 1922 |
| 1,529,691 | Davis | Mar. 17, 1925 |
| 1,724,704 | Fox | Aug. 13, 1929 |
| 1,750,704 | Hoenes | Mar. 11, 1930 |
| 1,877,817 | Cook | Sept. 20, 1932 |
| 2,122,219 | Wood | Aug. 20, 1940 |
| 2,347,453 | Becker | Apr. 25, 1944 |
| 2,649,071 | Newton et al. | Aug. 18, 1953 |
| 2,688,593 | Nelson | Sept. 7, 1954 |
| 2,876,146 | Peterson | Mar. 3, 1959 |

FOREIGN PATENTS

| | | |
|---|---|---|
| 830,498 | France | Aug. 1, 1938 |